US011338634B1

(12) United States Patent
Lacaze et al.

(10) Patent No.: US 11,338,634 B1
(45) Date of Patent: May 24, 2022

(54) VEHICLE CAPABLE OF MULTIPLE VARIETIES OF LOCOMOTION

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US); Katrina Corley, Gaithersburg, MD (US); Chris Jones, Gaithersburg, MD (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 0 days.

(21) Appl. No.: 16/566,788

(22) Filed: Sep. 10, 2019

Related U.S. Application Data

(63) Continuation of application No. 15/908,376, filed on Feb. 28, 2018, now abandoned, which is a continuation of application No. 14/928,648, filed on Oct. 30, 2015, now abandoned.

(60) Provisional application No. 62/072,811, filed on Oct. 30, 2014.

(51) Int. Cl.
*B64C 27/08* (2006.01)
*B60F 5/02* (2006.01)
*B64C 27/52* (2006.01)
*B64C 25/10* (2006.01)
*B60F 3/00* (2006.01)
*B63H 19/08* (2006.01)
(Continued)

(52) U.S. Cl.
CPC .............. *B60F 5/02* (2013.01); *B60F 3/0007* (2013.01); *B60F 3/0038* (2013.01); *B60F 3/0061* (2013.01); *B63B 35/00* (2013.01); *B63H 19/08* (2013.01); *B64C 11/001* (2013.01); *B64C 25/10* (2013.01); *B64C 27/08* (2013.01); *B64C 27/52* (2013.01)

(58) Field of Classification Search
CPC ........ B60F 5/02; B60F 3/0007; B60F 3/0038; B60F 3/0061; B63B 38/00; B63H 19/08; B64C 11/001; B64C 25/10; B64C 27/08; B64C 27/52
See application file for complete search history.

(56) References Cited

U.S. PATENT DOCUMENTS

| 2,702,171 A * | 2/1955 | Katzenberger | .......... B64C 25/54 244/101 |
| 7,398,946 B1 * | 7/2008 | Marshall | ................. B60L 53/11 244/58 |

(Continued)

OTHER PUBLICATIONS

McCloud, "Belts and Pulleys", Jun. 2014.*
X-Carcopter, Expendables 3 drone'), 2013, (https://www.youtube.com/watch?v=4mdxgZM4y-M).*

*Primary Examiner* — Assres H Woldemaryam
(74) *Attorney, Agent, or Firm* — RowanTree Law Group, PLLC; Carson C. K. Fincham

(57) ABSTRACT

The present invention presents a vehicle that is capable of utilizing different methods of movement by rotating its propellers to accommodate air, ground, or water locomotion. The present invention includes being able to change the direction of the thrust mechanism, so that it creates thrust in the direction of flight, but it is hinged to provide full protection to the blades in the ground modality. In the case of the water implementation, these propellers are also used to provide horizontal thrust to the vessel.

9 Claims, 21 Drawing Sheets

(51) Int. Cl.
  *B64C 11/00*   (2006.01)
  *B63B 35/00*   (2020.01)

(56) References Cited

U.S. PATENT DOCUMENTS

| | | | | |
|---|---|---|---|---|
| 7,959,104 | B2* | 6/2011 | Kuntz | A63H 33/003 244/2 |
| 8,167,234 | B1* | 5/2012 | Moore | B64C 37/00 244/17.23 |
| 8,342,440 | B2* | 1/2013 | Papanikolopoulos | A63H 27/12 244/17.11 |
| 8,827,200 | B2* | 9/2014 | Radu | B60F 5/02 244/2 |
| 8,991,740 | B2* | 3/2015 | Olm | B60F 5/02 244/2 |
| 9,145,207 | B2* | 9/2015 | Moschetta | B64C 25/36 |
| 9,216,745 | B2 | 12/2015 | Beardsley et al. | |
| 9,550,400 | B2* | 1/2017 | Hutson | B60F 5/02 |
| 2002/0060267 | A1* | 5/2002 | Yavnai | G05D 1/0038 244/23 A |
| 2005/0004723 | A1 | 1/2005 | Duggan et al. | |
| 2005/0027412 | A1* | 2/2005 | Hobson | B60F 3/0007 701/21 |
| 2008/0048065 | A1* | 2/2008 | Kuntz | B64C 39/024 244/17.23 |
| 2010/0193626 | A1* | 8/2010 | Goossen | B64C 37/00 244/2 |
| 2011/0226898 | A1* | 9/2011 | Smith | B64D 25/00 244/1 OOA |
| 2014/0034775 | A1* | 2/2014 | Hutson | B64C 39/024 244/17.17 |
| 2014/0034776 | A1* | 2/2014 | Hutson | B64D 45/00 244/17.17 |
| 2014/0131507 | A1* | 5/2014 | Kalantari | A63H 27/12 244/2 |
| 2014/0252166 | A1* | 9/2014 | Smith | B64C 25/56 244/107 |
| 2016/0114887 | A1* | 4/2016 | Zhou | B60F 5/02 348/148 |
| 2019/0009756 | A1 | 1/2019 | Jacobs | |

\* cited by examiner

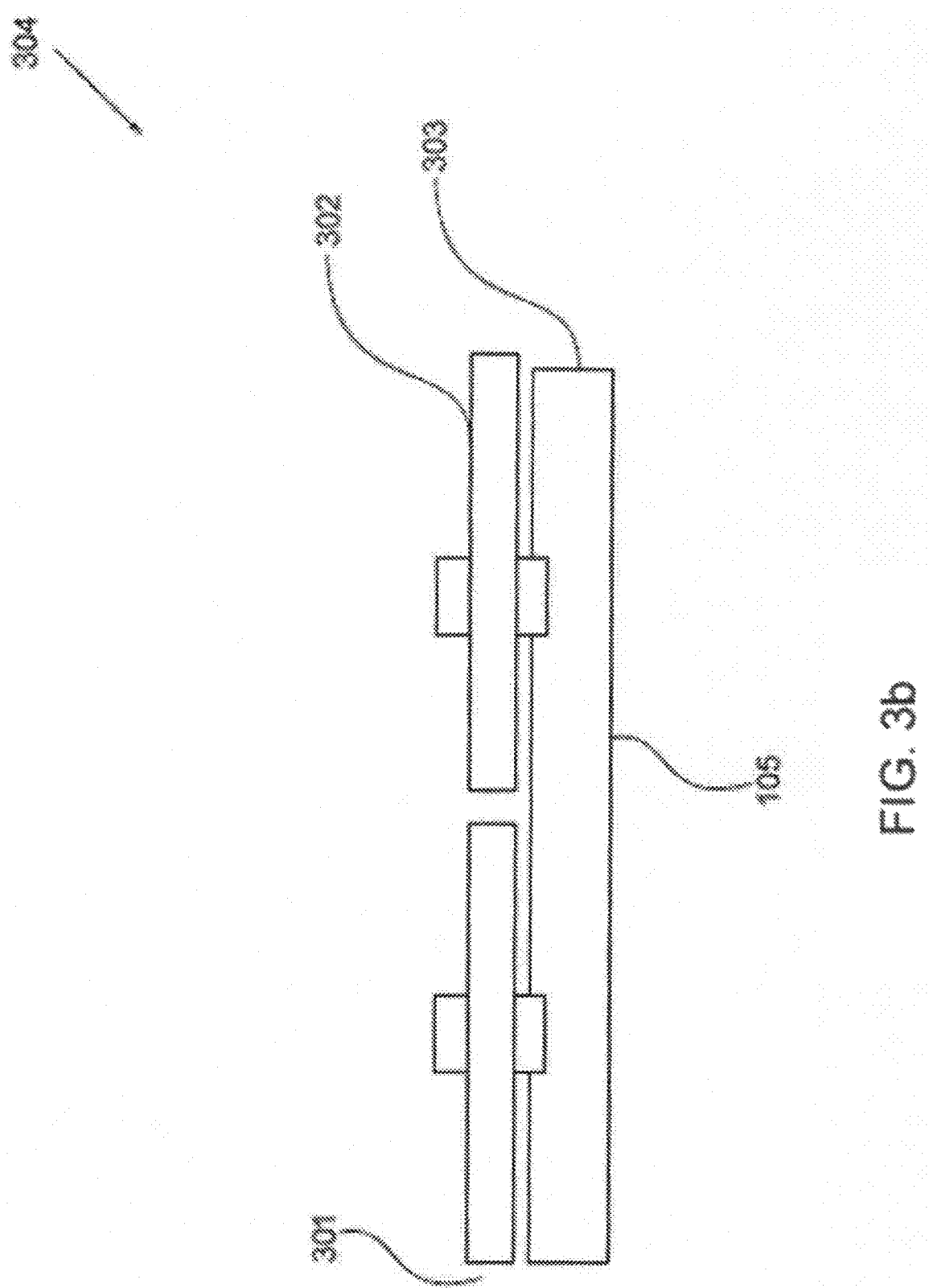

VEHICLE CAPABLE OF MULTIPLE VARIETIES OF LOCOMOTION

FEDERALLY SPONSORED RESEARCH

Not Applicable

SEQUENCE LISTING OR PROGRAM

Not Applicable

TECHNICAL FIELD OF THE INVENTION

The present invention relates generally to a vehicle capable of multiple varieties of locomotion. More specifically, the present invention relates to a vehicle that is capable of utilizing different methods of movement by rotating its propellers to accommodate air, ground, or water locomotion.

BACKGROUND OF THE INVENTION

Quadrotors and hexrotors have revolutionized a variety of applications, including toys, the delivery of goods, or the delivery of devices and information in the battlefield. Although the ability to fly allows such devices to reach locations that are inaccessible to ground vehicles, there are locations where ground vehicles are still best suited for a given task.

For example, a policeman involved in a hostage situation may like to have a flying vehicle capable of traversing an open doorway; however, he may then prefer to possess a ground vehicle for traversing the indoors of the building in search of the suspect. A combination between air and ground vehicles would be better suited for this mission. In particular, such a vehicle would be able to provide a significantly longer work time, since the ground vehicle consumes significantly less energy than the quadrotor. Similar levels of efficiency can be found with a quadrotor that becomes an air-boat. In the next section, we will present different embodiments of the invention.

SUMMARY OF THE INVENTION

The present invention provides a mechanism for creating vehicles that are capable of various kinds of movement or locomotion. The unique aspect of the present invention includes being able to change the direction of the thrust mechanism, so that it creates thrust in the direction of flight, but it is hinged to provide full protection to the blades in the ground modality. In the case of the water implementation, these propellers are also used to provide horizontal thrust to the vessel.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

FIGS. 3a-3b illustrate air and water device rotates propellers to provide horizontal thrust to power watercraft;

DETAILED DESCRIPTION OF THE INVENTION

Figure 1A:
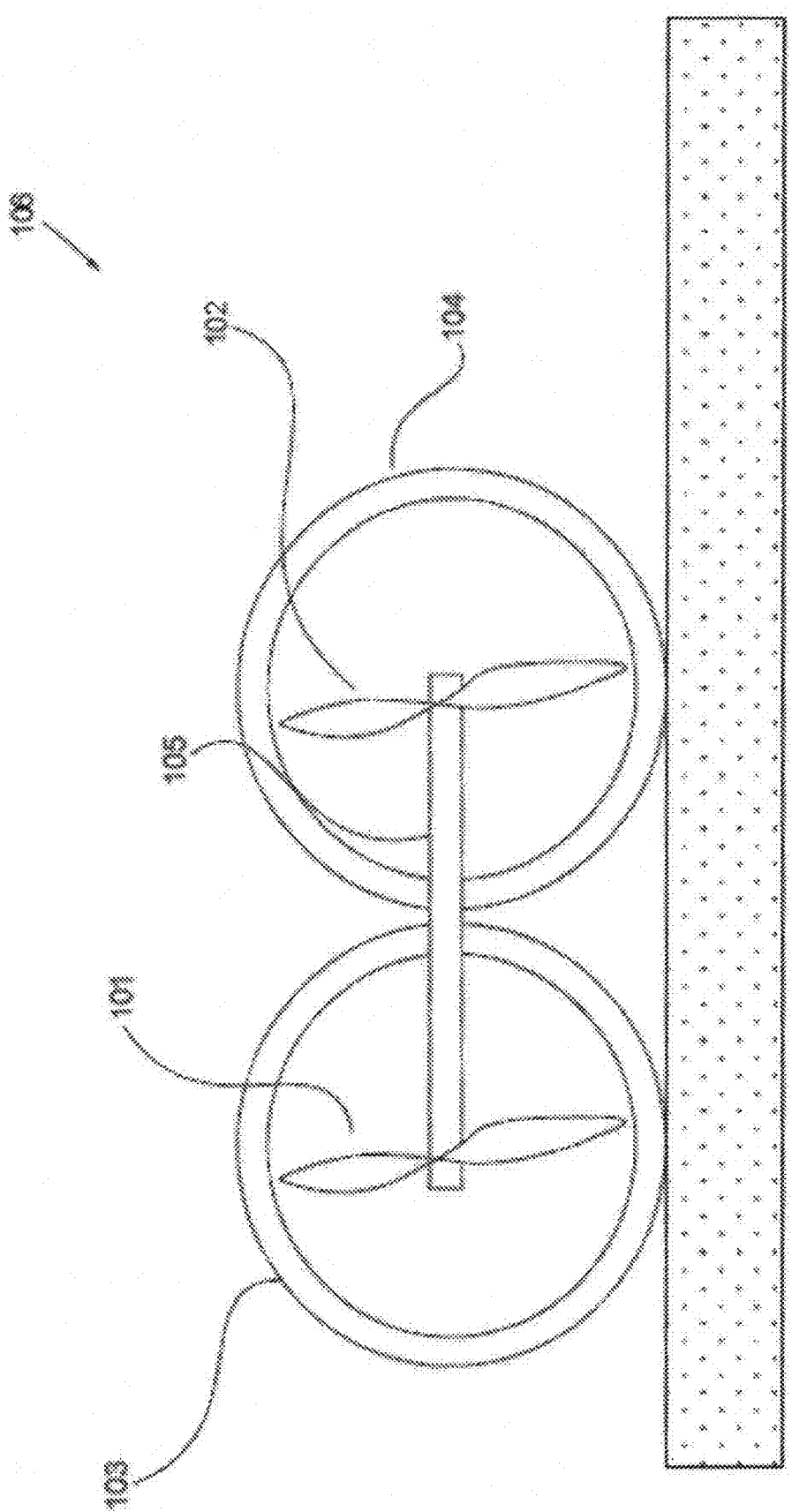
FIGS. 1a-1b illustrate how the ground-air vehicle hinges the propellers and the shrouds/wheels to transform from air to ground vehicle.
Figure 1B:
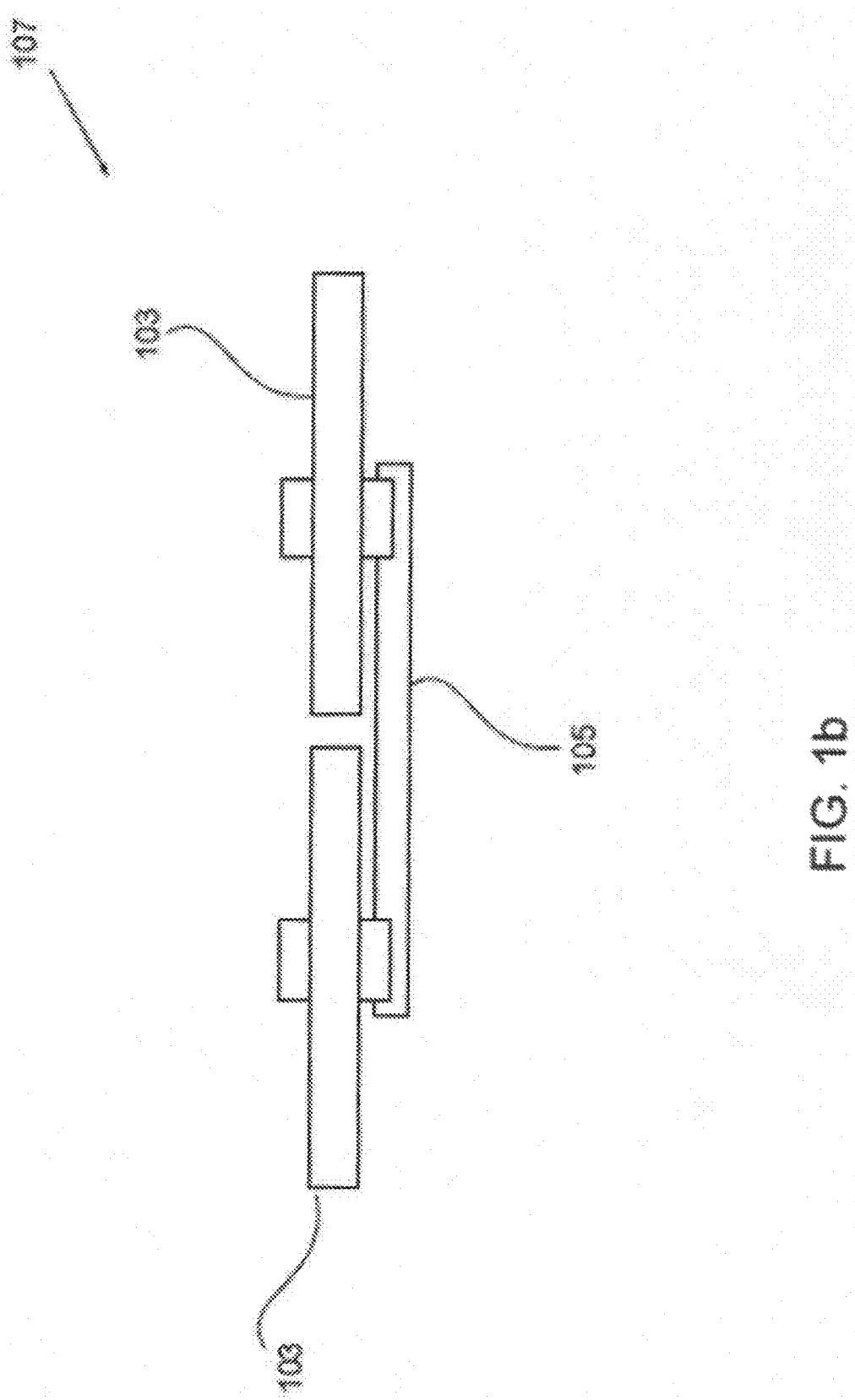
Figure 2A:
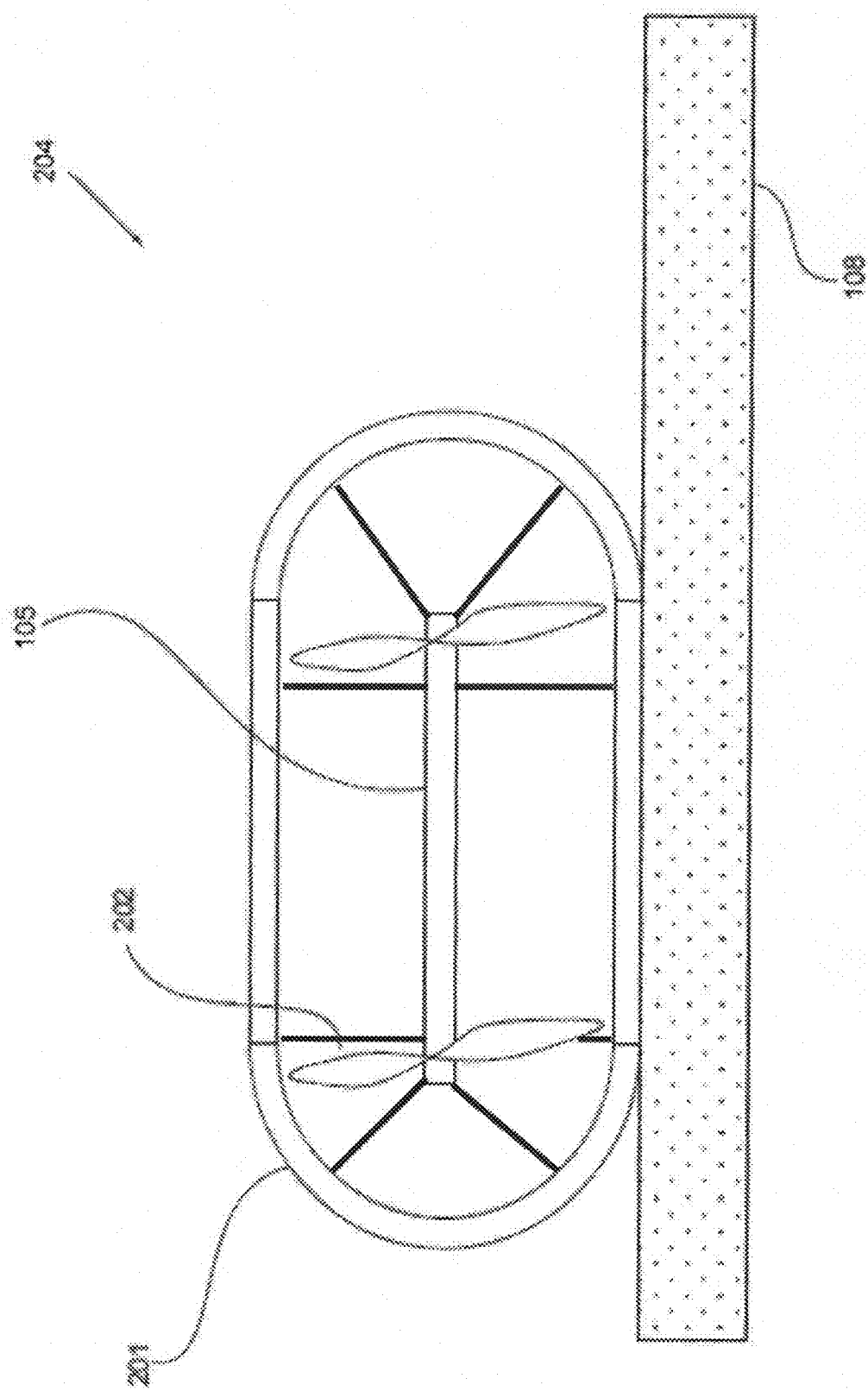
FIGS. 2a-2b illustrate a continuous belt/treads can be used to shroud the propellers.
Figure 2B:
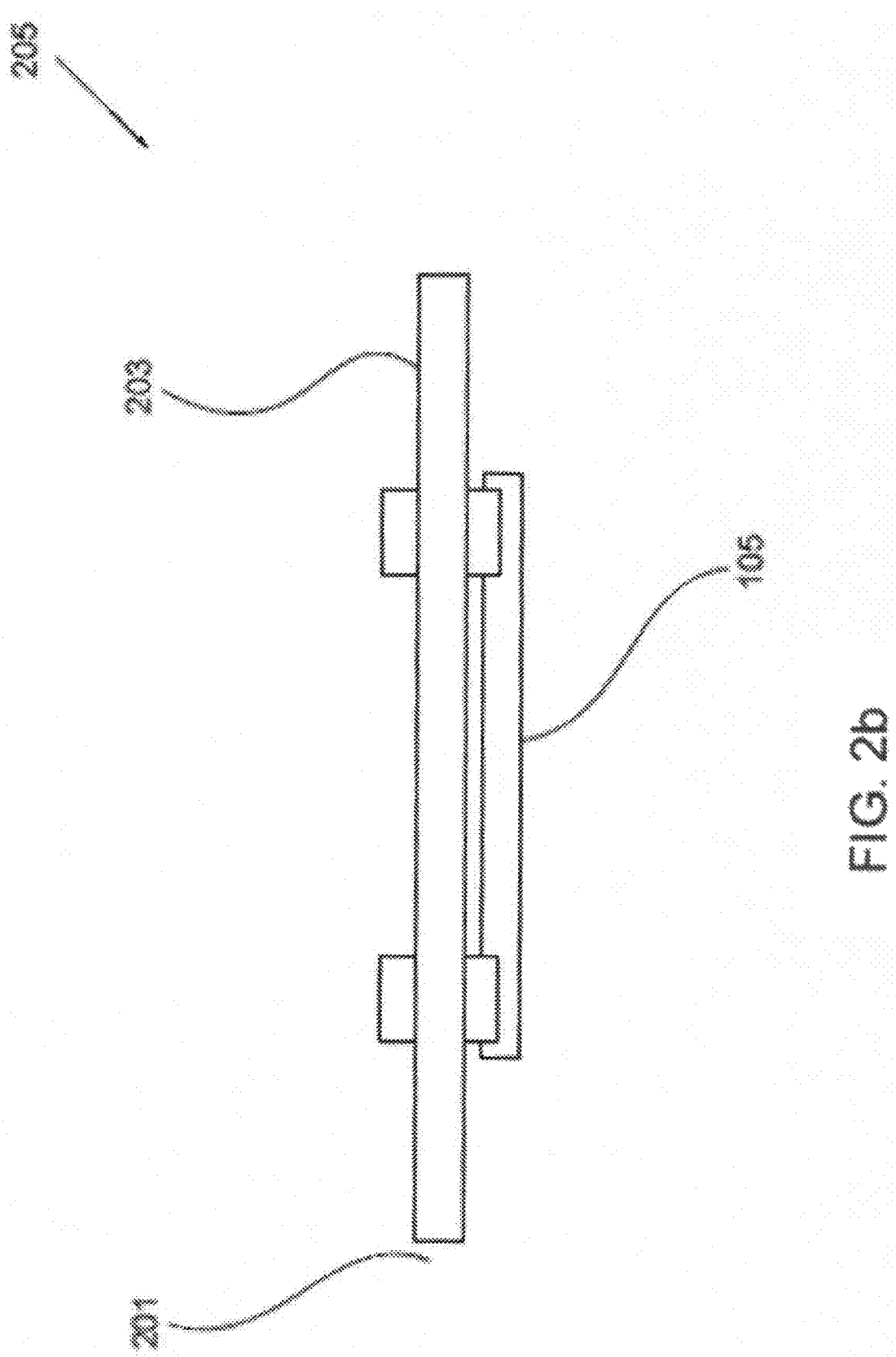

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Now referring to the Figures, the embodiment of the invention presents, a vehicle capable of multiple varieties of locomotion is shown. In the present invention, a quadrotor capable of propulsion on the ground by utilizing a series of key advantages is present.

Now referring to FIGS. 1a-1b and 2a-2b, the blades or propellers 101 and 102 are shrouded (protected at all times) by the wheels or tracks 103 and 104 used for propulsion. The thrust of the quadrotor blades 101 and 102 pass through the shroud 103 and 104, which doubles as a wheel or track 103 and 104.

The axes of rotation of the propellers are rotated around a hinge 105 from vertical 106 (or almost vertical) when being used as a flying vehicle (to generate downwards thrust), to horizontal 107 (or almost horizontal) to accommodate wheels 101 and 102, which are mostly perpendicular to the ground surface 108.

Similarly, the shroud can be built as a tread 201 that surrounds two propellers 202 and 203, transforming the vehicle's air modality to a ground modality, as displayed in FIGS. 1a-1b and 2a-2b. The switch between ground 204 and air 205 locomotion is performed using an actuated hinge 105 that changes the axes of rotation of the propulsion mechanisms.

Figure 5A:
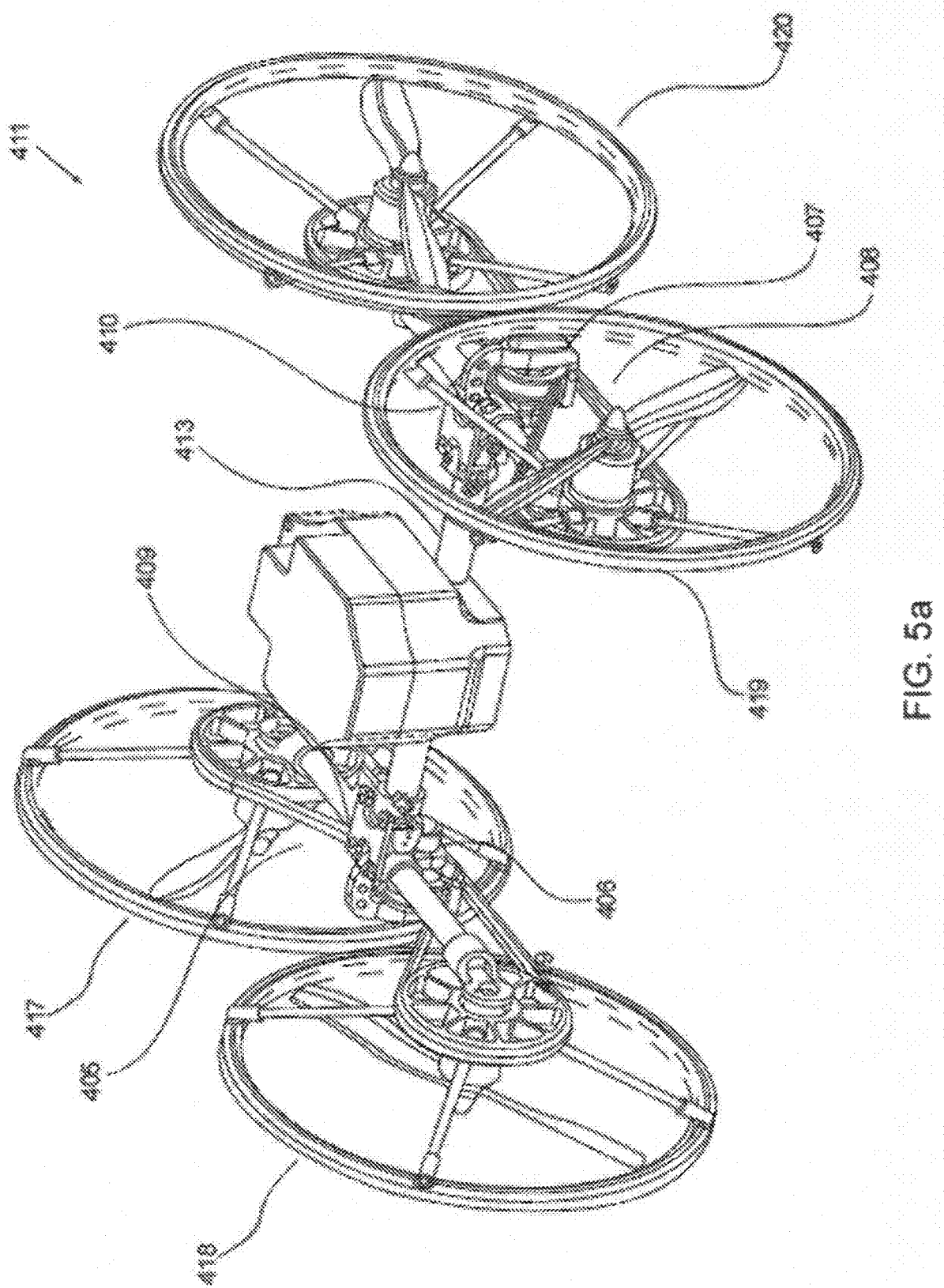
FIGS. 5a-5b illustrate ground-air vehicle prototypes.
Figure 5B:
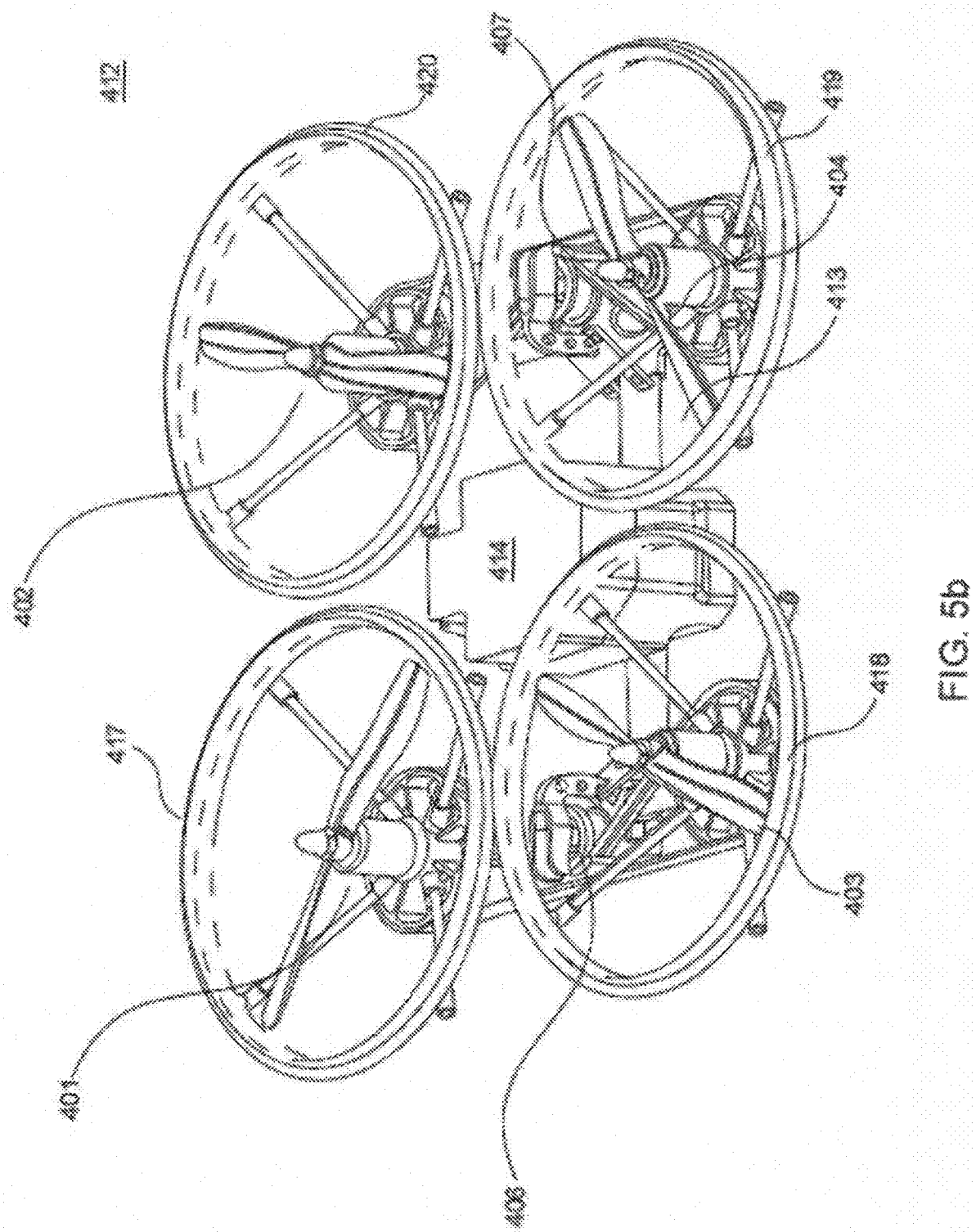

In order to power the propellers, four motors 401, 402, 403, and 404 can be used (as in a conventional quadrotors); or, a single motor can be used, in conjunction with belts to provide power and thrust to the device. The ground propulsion can be accomplished by the use of a belt 405 and 408, or a direct interface between the shroud and a secondary ground propulsion motor 406 and 407 on each side of the vehicle as shown in FIGS. 5a and 5b.

Figure 3A:
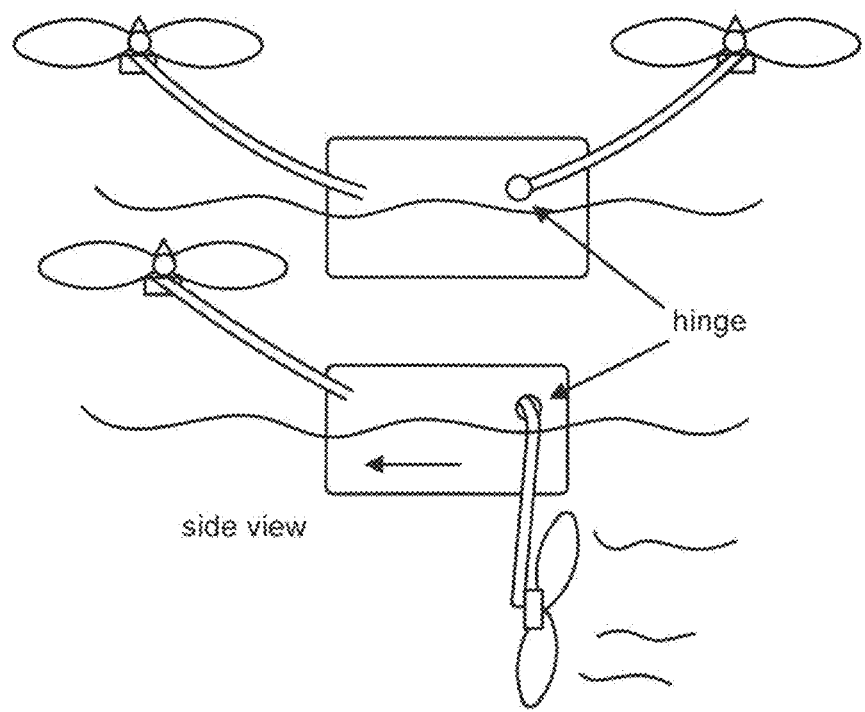

Just as in the case of ground and air, the described vehicle is capable of transforming from one specific modality to another. Once again, the axis of rotation of the quadrotor blades is changed from the flying modality to the water modality 300, as shown in FIGS. 3a-3b.

Figure 4A:
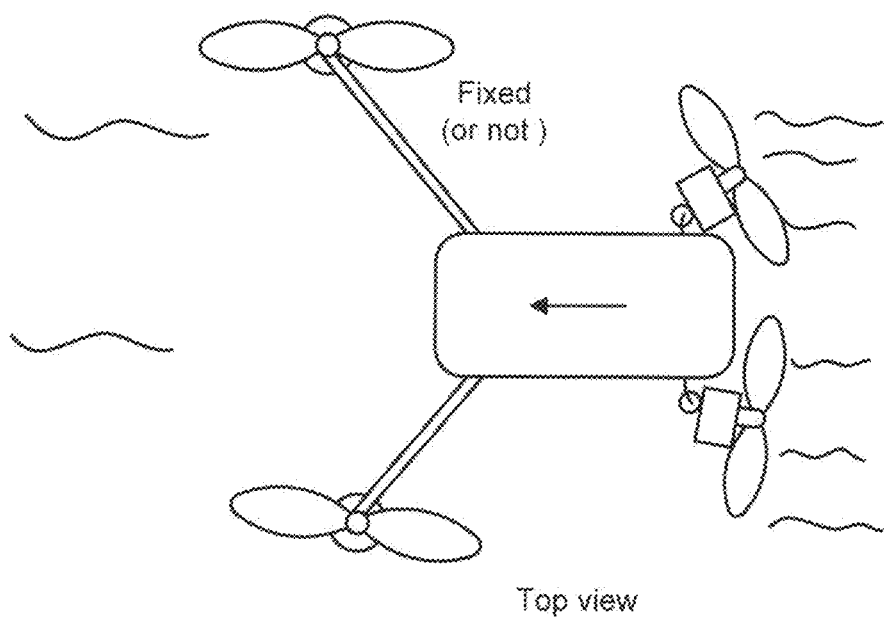
FIGS. 4a-4b illustrate alternative air-water configurations.
Figure 4B:
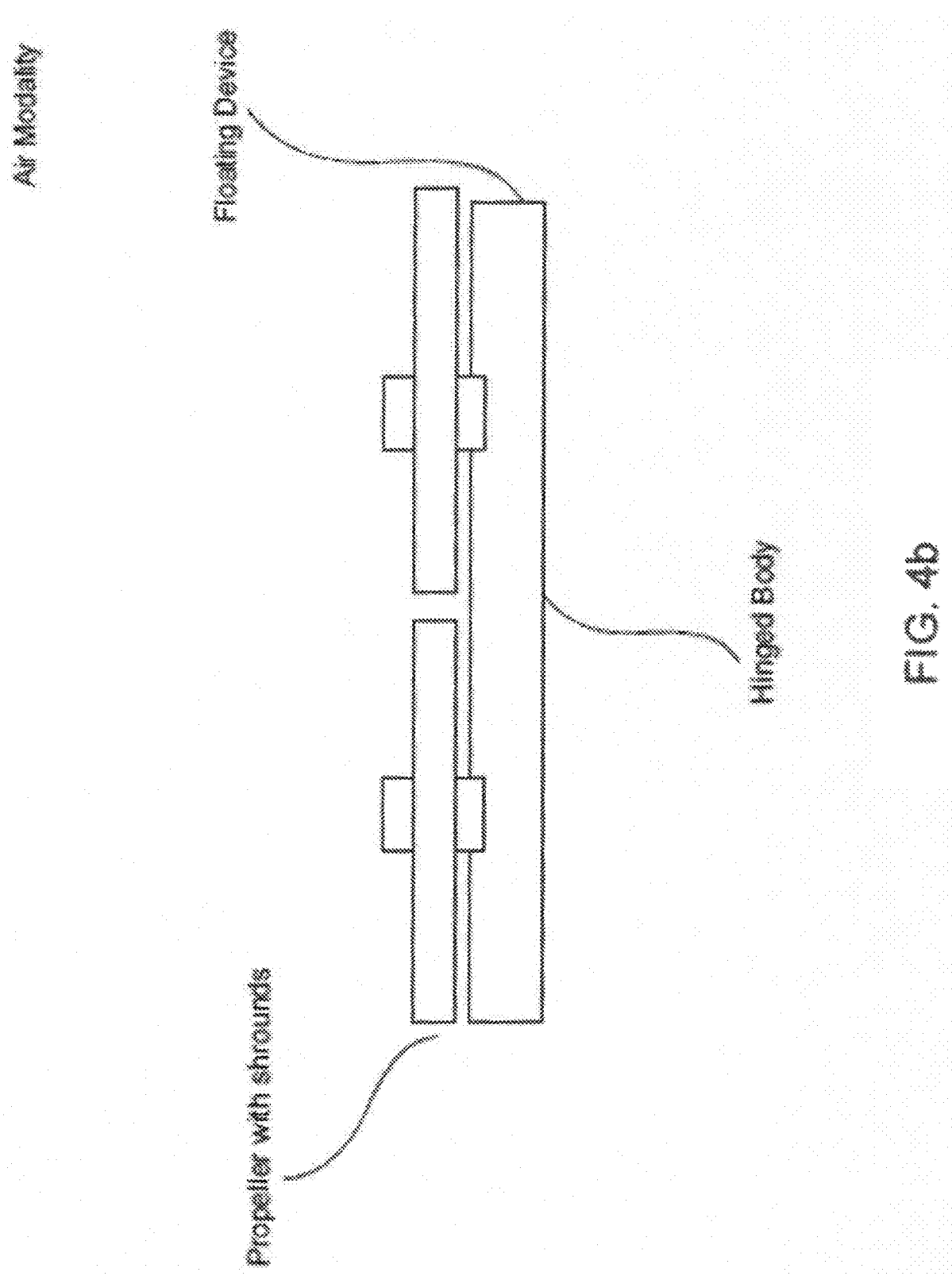

An alternative configuration is shown in FIGS. 4a-4b, where the propellers are rotated in a different direction to produce the horizontal thrust. In this design, the shrouds 301 and 302 can be part of the flotation device 303, or be attached to provide protection when the vehicle is in flight mode 304, while still maintaining the ability to expose the propellers while in water mode.

Finally, in a third modality, all three methods of locomotion are used to create a vehicle that can drive, fly, and float. Ground propulsion is provided by the shroud/wheels 301 and 302, while air and water propulsion is achieved by using the thrust from the propellers 101 and 102.

FIGS. 5a-5b illustrate a prototype device in CAD/CAM format. In order to power the propellers, four motors 401, 402, 403, and 404 can be used (as in a conventional quadrotors); or, a single motor can be used, in conjunction with belts to provide power and thrust to the device. The ground propulsion can be accomplished by the use of a belt 405 and 408, or a direct interface between the shroud and a secondary ground propulsion motor 406 and 407 on each side of the vehicle as shown in FIGS. 5a and 5b.

In the embodiment of FIGS. 5a and 5b, the individual electric motors 401, 402, 403, and 404 are in pairs and each pair rotates around a hinge 409 and 410 attached to a secondary ground propulsion motor 406 and 407 on each side of the vehicle, enabling the device to rotate between a ground mode 411 and an aerial mode 412. The hinges 409 and 410 are mounted on a central spine 413 runs through and it attached to a central payload, battery, or control component module 414. The spine 413 extends from the central payload, battery, or control component module 414 and the hinges 409 and 410 are connected at the opposing ends of the spine 413. The hinges 409 and 410 are then each further connected to rotating hinges/spines 415 and 416 which runs perpendicular to the spine 413 and can be rotated 90 degrees. The rotating hinges/spines 415 and 416 have on their opposing ends, the propulsion blades 421, 422, 423, 424 and shrouds 417, 418, 419, and 420 which can either be driven by individual motors and/or by a central motors 406 and 407 located as part of the rotating hinge 409 and 410 which drives each corresponding shroud 417, 418, 419, and 420 by a belt 405 and 408.

Figure 6:
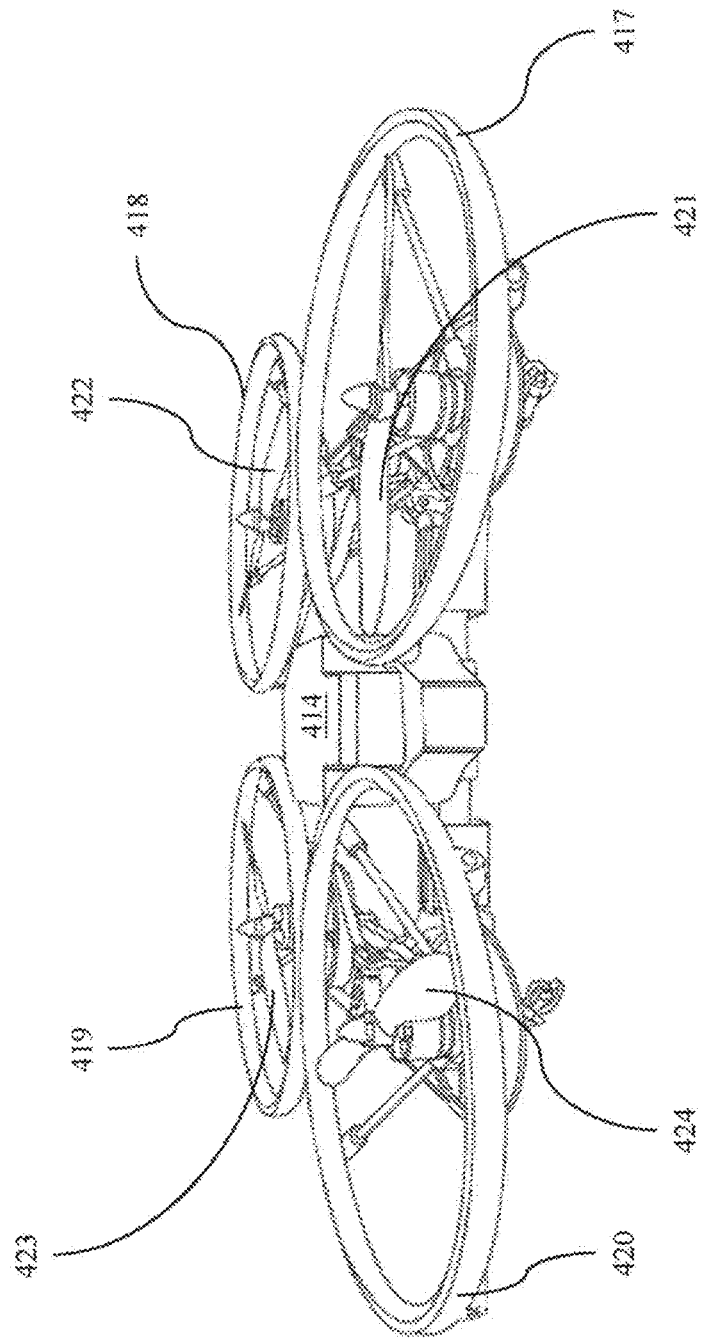
FIG. 6 illustrates a back perspective view of a vehicle capable of multiple varieties of locomotion comprising four propellers shrouded by wheels or tracks used for propulsion, the four propellers are rotated around a hinge from a vertical orientation to a horizontal orientation with respect to the vehicle body when being used as a flying vehicle to generate downwards thrust.

FIG. 6 illustrates a back perspective view of a vehicle capable of multiple varieties of locomotion comprising four propellers 421, 422, 423, and 424 shrouded 417, 418, 419, and 420 by wheels or tracks used for propulsion, the four propellers 421, 422, 423, and 424 are rotated around a hinge 409 and 410 from a vertical orientation 106 to a horizontal orientation 107 with respect to the vehicle body when being used as a flying vehicle in aerial mode 412 to generate downwards thrust.

Figure 7:
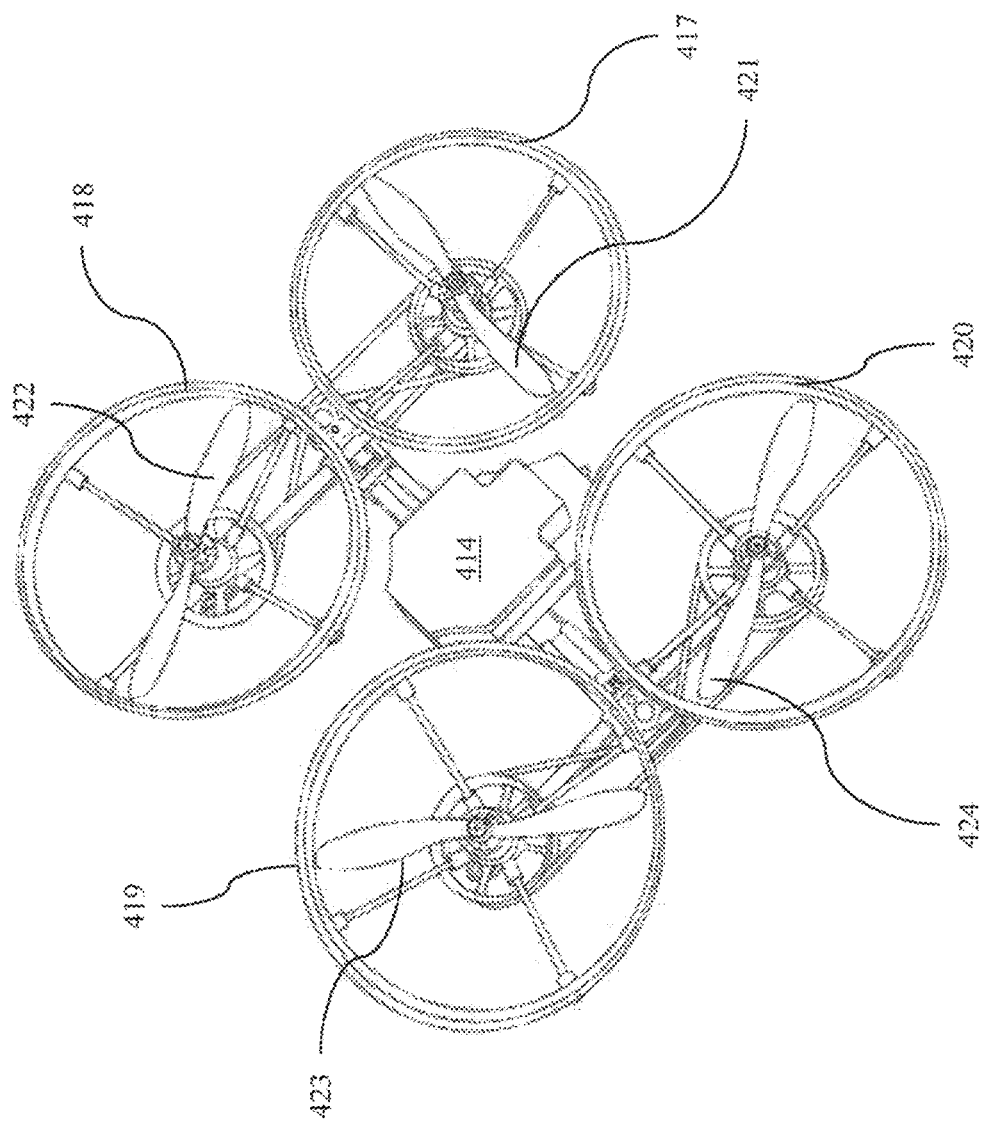
FIG. 7 is a top side planar view of a vehicle capable of multiple varieties of locomotion comprising four propellers shrouded by wheels or tracks used for propulsion, the four propellers are rotated around a hinge from a vertical orientation to a horizontal orientation with respect to the vehicle body when being used as a flying vehicle to generate downwards thrust.

FIG. 7 is a top side planar view of a vehicle capable of multiple varieties of locomotion comprising four propellers 421, 422, 423, and 424 shrouded 417, 418, 419, and 420 by wheels or tracks used for propulsion, the four propellers 421, 422, 423, and 424 are rotated around a hinge 409 and 410 from a vertical orientation 106 to a horizontal orientation 107 with respect to the vehicle body when being used as a flying vehicle in aerial mode 412 to generate downwards thrust.

Figure 8:
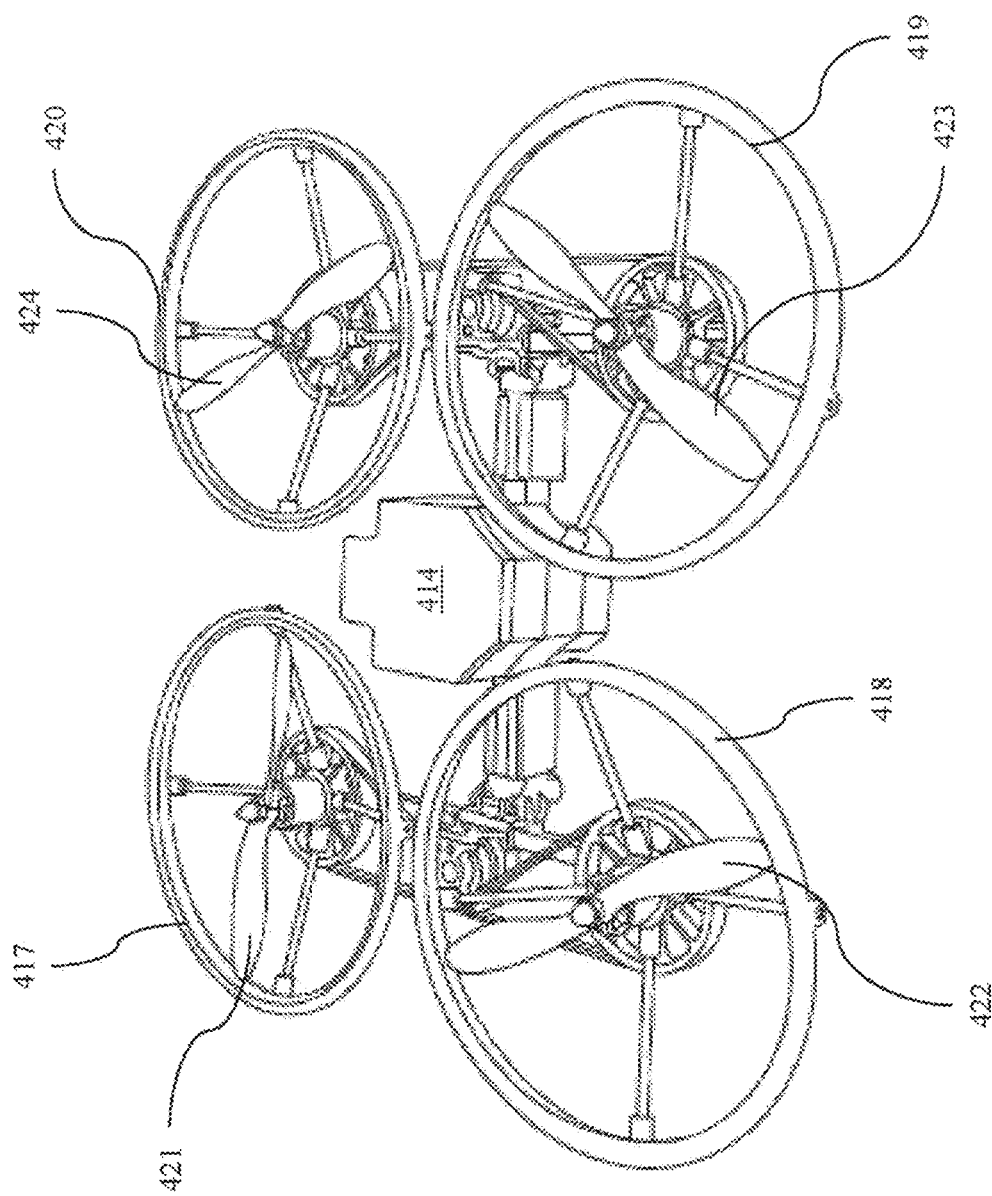
FIG. 8 is a top front perspective view of a vehicle capable of multiple varieties of locomotion comprising four propellers shrouded by wheels or tracks used for propulsion, the four propellers are rotated around a hinge from a vertical orientation to a horizontal orientation with respect to the vehicle body when being used as a flying vehicle to generate downwards thrust.

FIG. 8 is a top front perspective view of a vehicle capable of multiple varieties of locomotion comprising four propellers 421, 422, 423, and 424 shrouded 417, 418, 419, and 420 by wheels or tracks used for propulsion, the four propellers 421, 422, 423, and 424 are rotated around a hinge 409 and 410 from a vertical orientation 106 to a horizontal orientation 107 with respect to the vehicle body when being used as a flying vehicle in aerial mode 412 to generate downwards thrust.

Figure 9:
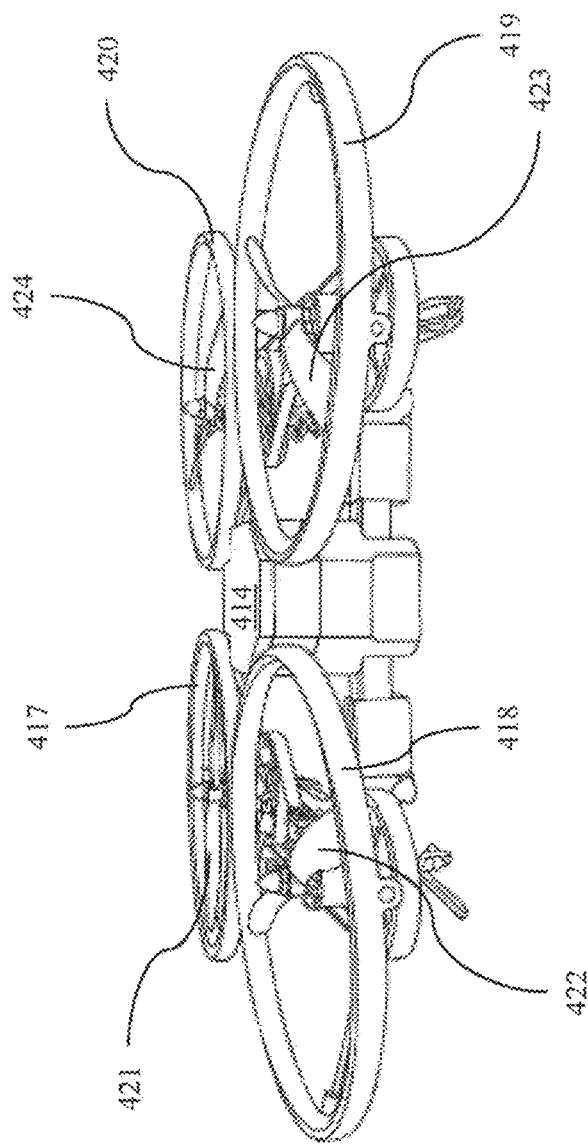
FIG. 9 is a front perspective view of a vehicle capable of multiple varieties of locomotion comprising four propellers shrouded by wheels or tracks used for propulsion, the four propellers are rotated around a hinge from a vertical orientation to a horizontal orientation with respect to the vehicle body when being used as a flying vehicle to generate downwards thrust.

FIG. 9 is a front perspective view of a vehicle capable of multiple varieties of locomotion comprising four propellers 421, 422, 423, and 424 shrouded 417, 418, 419, and 420 by wheels or tracks used for propulsion, the four propellers 421, 422, 423, and 424 are rotated around a hinge 409 and 410 from a vertical orientation 106 to a horizontal orientation 107 with respect to the vehicle body when being used as a flying vehicle in aerial mode 412 to generate downwards thrust.

Figure 10:
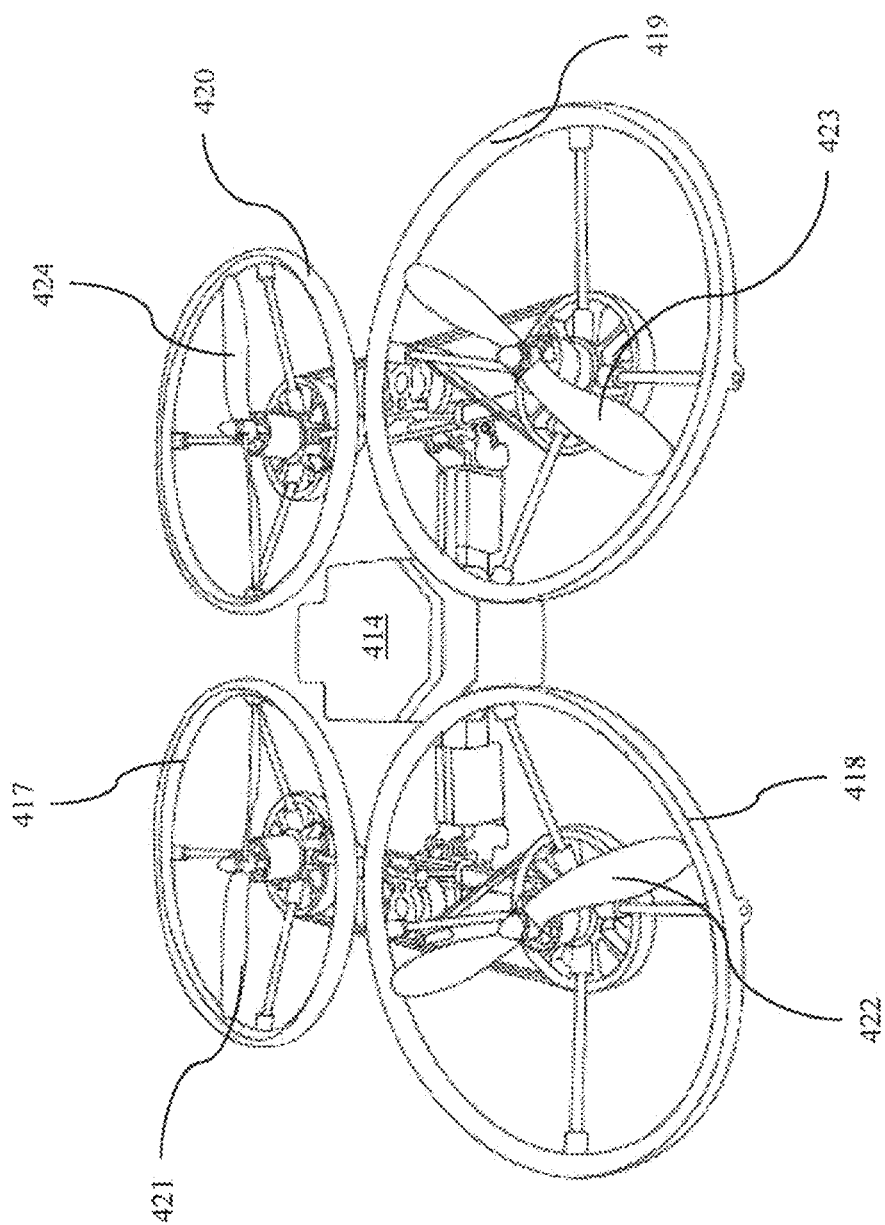
FIG. 10 is a top front perspective view of a vehicle capable of multiple varieties of locomotion comprising four propellers shrouded by wheels or tracks used for propulsion, the four propellers are rotated around a hinge from a vertical orientation to a horizontal orientation with respect to the vehicle body when being used as a flying vehicle to generate downwards thrust.

FIG. 10 is a top front perspective view of a vehicle capable of multiple varieties of locomotion comprising four propellers 421, 422, 423, and 424 shrouded 417, 418, 419, and 420 by wheels or tracks used for propulsion, the four propellers 421, 422, 423, and 424 are rotated around a hinge 409 and 410 from a vertical orientation 106 to a horizontal orientation 107 with respect to the vehicle body when being used as a flying vehicle in aerial mode 412 to generate downwards thrust.

Figure 11:
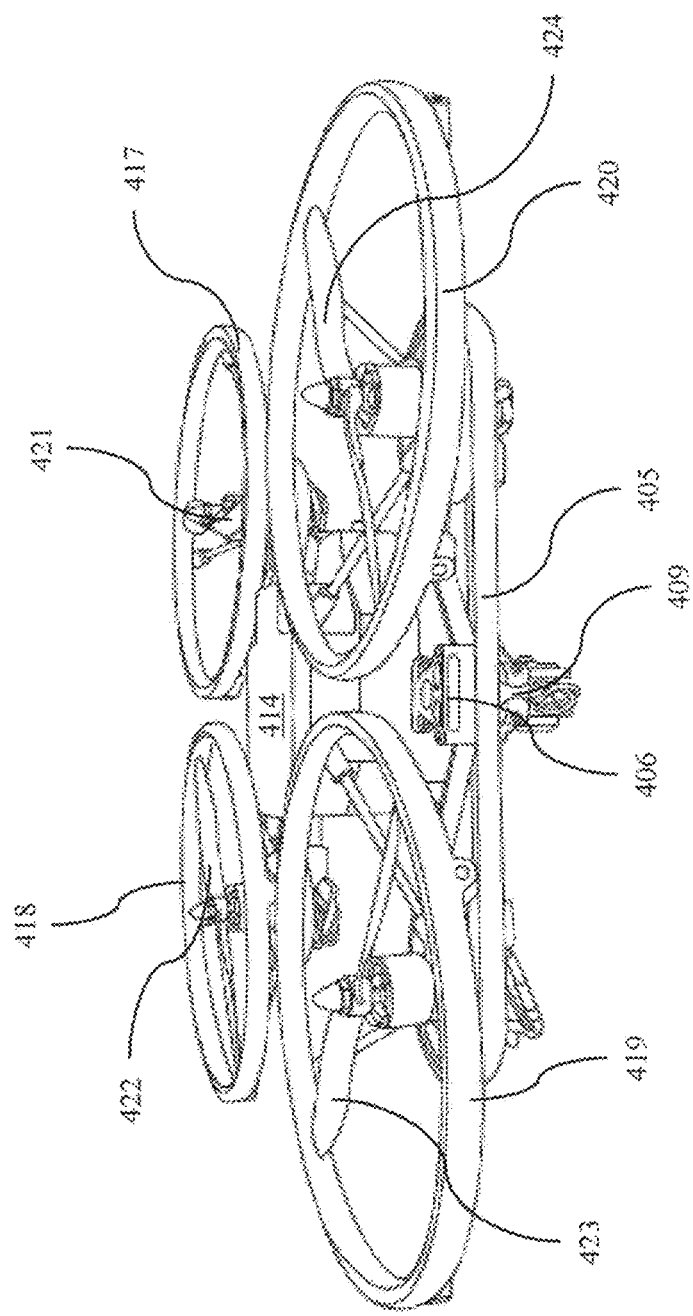
FIG. 11 is a top side planar view of a vehicle capable of multiple varieties of locomotion comprising four propellers shrouded by wheels or tracks used for propulsion, the four propellers are rotated around a hinge from a vertical orientation to a horizontal orientation with respect to the vehicle body when being used as a flying vehicle to generate downwards thrust.

FIG. 11 is a top side planar view of a vehicle capable of multiple varieties of locomotion comprising four propellers 421, 422, 423, and 424 shrouded 417, 418, 419, and 420 by wheels or tracks used for propulsion, the four propellers 421, 422, 423, and 424 are rotated around a hinge 409 and 410 from a vertical orientation 106 to a horizontal orientation 107 with respect to the vehicle body when being used as a flying vehicle in aerial mode 412 to generate downwards thrust.

Figure 12:
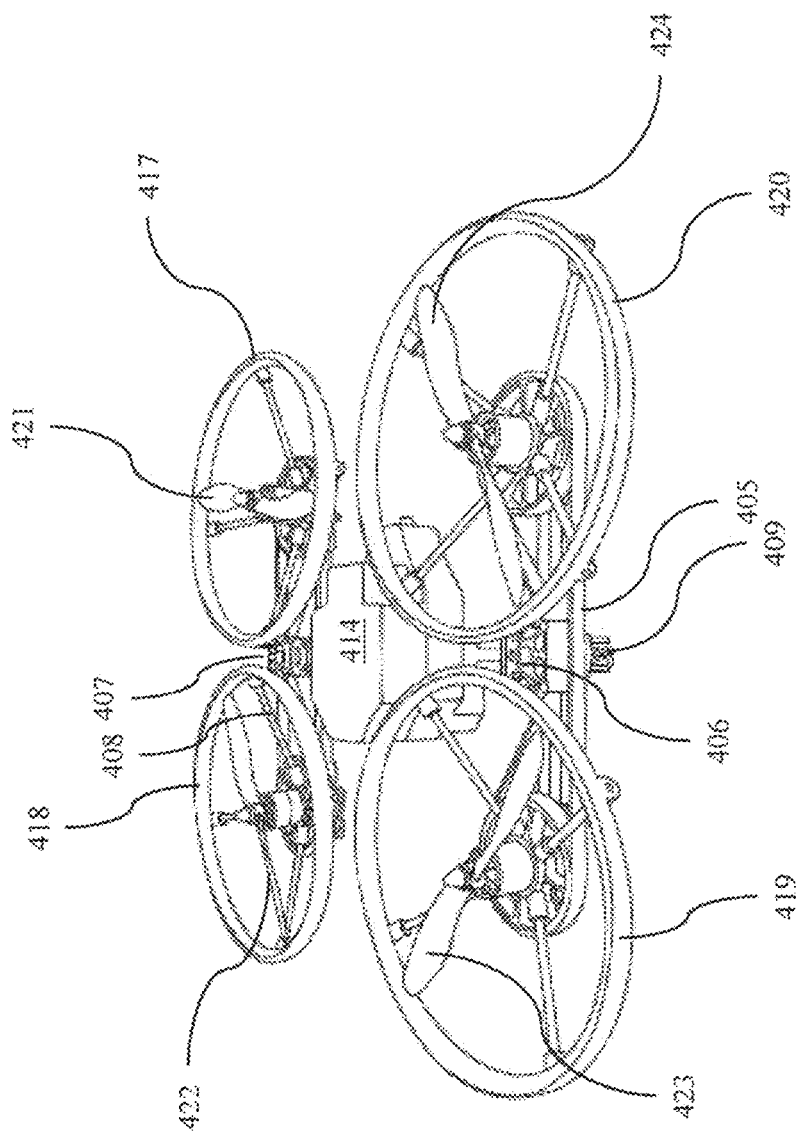
FIG. 12 is a top side perspective view of a vehicle capable of multiple varieties of locomotion comprising four propellers shrouded by wheels or tracks used for propulsion, the four propellers are rotated around a hinge from a vertical orientation to a horizontal orientation with respect to the vehicle body when being used as a flying vehicle to generate downwards thrust.

FIG. 12 is a top side perspective view of a vehicle capable of multiple varieties of locomotion comprising four propellers 421, 422, 423, and 424 shrouded 417, 418, 419, and 420 by wheels or tracks used for propulsion, the four propellers 421, 422, 423, and 424 are rotated around a hinge 409 and 410 from a vertical orientation 106 to a horizontal orientation 107 with respect to the vehicle body when being used as a flying vehicle in aerial mode 412 to generate downwards thrust.

Figure 13:
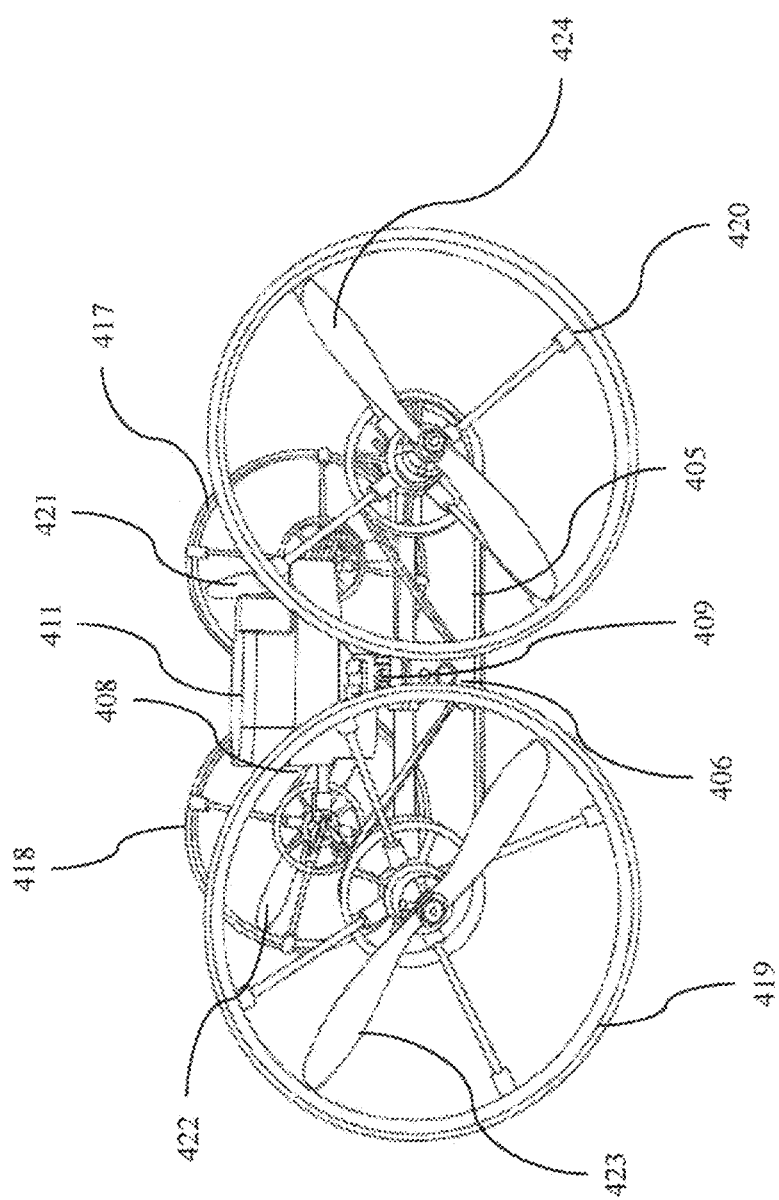
FIG. 13 is a side view of a vehicle capable of multiple varieties of locomotion comprising four propellers shrouded by wheels or tracks used for propulsion, the four propellers will turn into a conventional four wheeled vehicle.

FIG. 13 is a side view of a vehicle capable of multiple varieties of locomotion comprising four propellers 421, 422, 423, and 424 shrouded 417, 418, 419, and 420 by wheels or tracks used for propulsion, the four propellers 421, 422, 423, and 424 will turn into a conventional ground mode 411 four wheeled vehicle.

Figure 14:
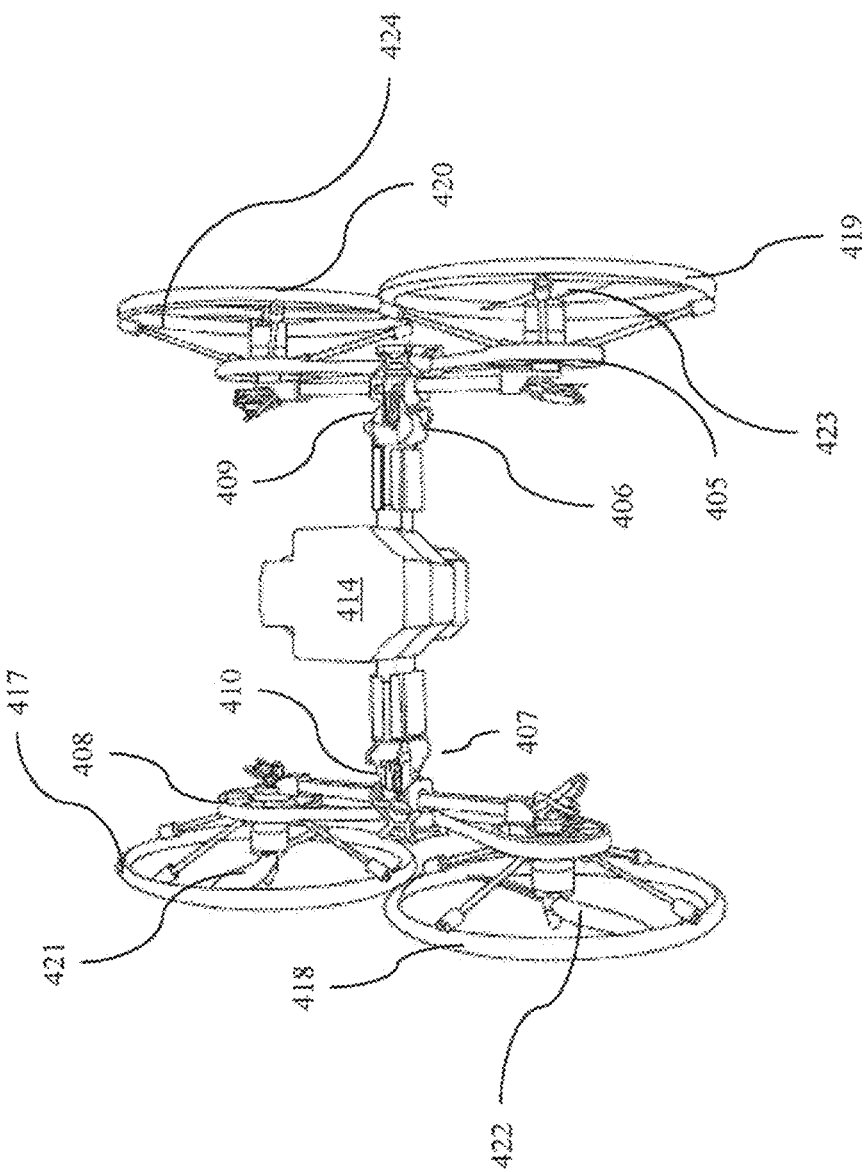
FIG. 14 is a top front perspective view of a vehicle capable of multiple varieties of locomotion comprising four propellers shrouded by wheels or tracks used for propulsion, the four propellers will turn into a conventional four wheeled vehicle.

FIG. 14 is a top front perspective view of a vehicle capable of multiple varieties of locomotion comprising four propellers 421, 422, 423, and 424 shrouded 417, 418, 419, and 420 by wheels or tracks used for propulsion, the four propellers 421, 422, 423, and 424 will turn into a conventional ground mode 411 four wheeled vehicle.

Figure 15:
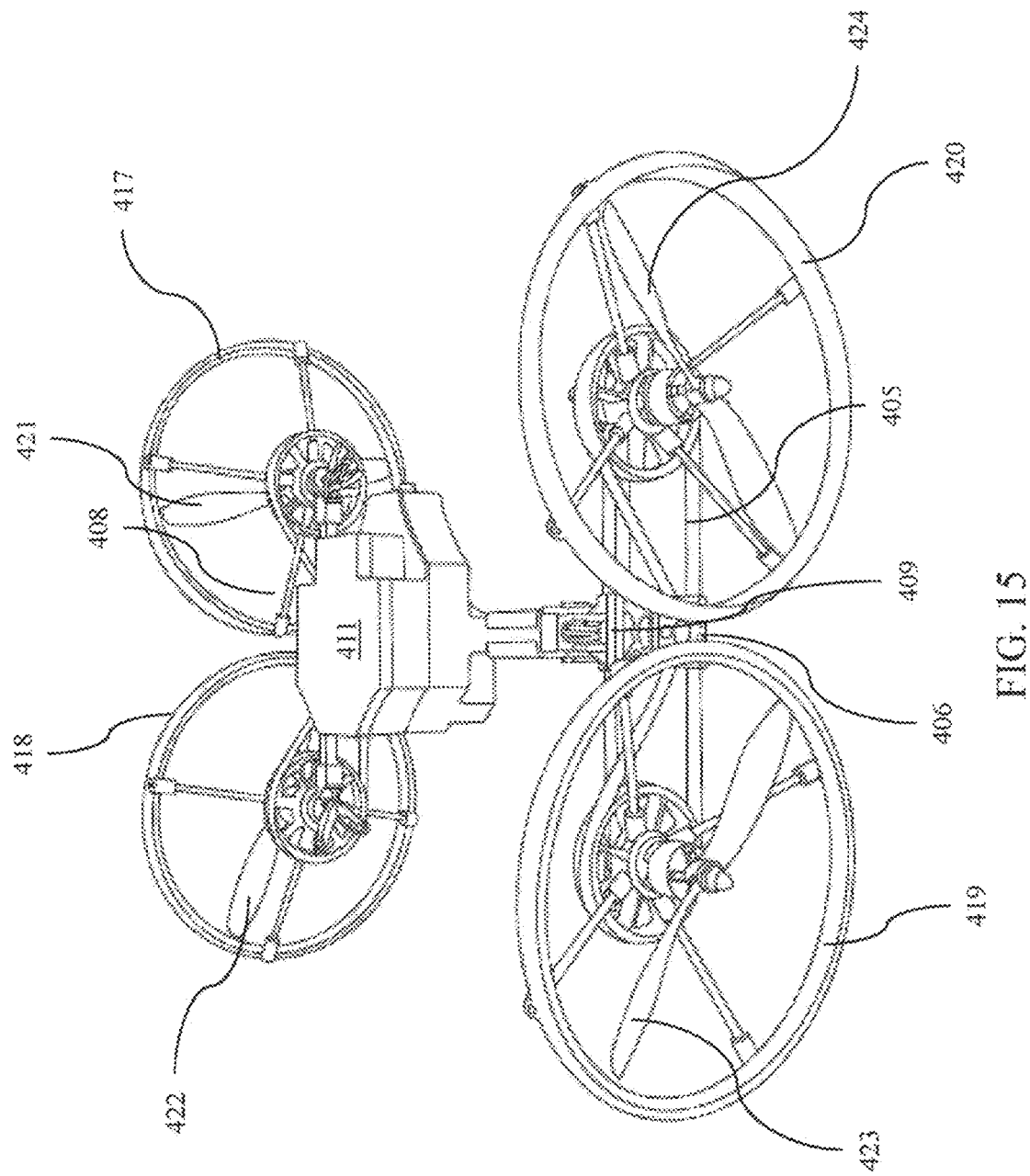
FIG. 15 is a top side view of a vehicle capable of multiple varieties of locomotion comprising four propellers shrouded by wheels or tracks used for propulsion, the four propellers will turn into a conventional four wheeled vehicle.

FIG. 15 is a top side view of a vehicle capable of multiple varieties of locomotion comprising four propellers 421, 422, 423, and 424 shrouded 417, 418, 419, and 420 by wheels or tracks used for propulsion, the four propellers 421, 422, 423, and 424 will turn into a conventional ground mode 411 four wheeled vehicle.

Figure 16:
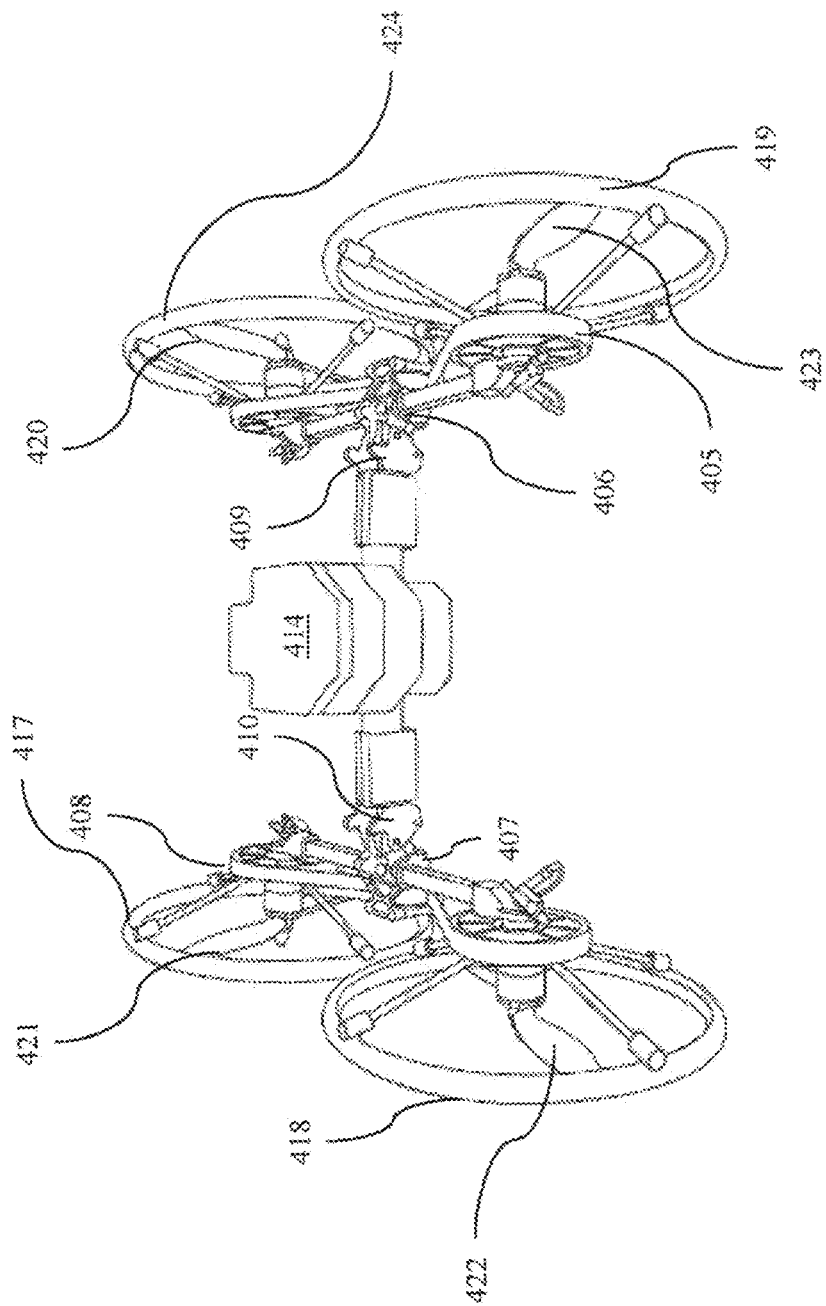
FIG. 16 is a front view of a vehicle capable of multiple varieties of locomotion comprising four propellers shrouded by wheels or tracks used for propulsion, the four propellers will turn into a conventional four wheeled vehicle.

FIG. 16 is a front view of a vehicle capable of multiple varieties of locomotion comprising four propellers 421, 422, 423, and 424 shrouded 417, 418, 419, and 420 by wheels or tracks used for propulsion, the four propellers 421, 422, 423, and 424 will turn into a conventional ground mode 411 four wheeled vehicle.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A vehicle capable of multiple locomotion modalities, the vehicle comprising:
    a main body;
    a central spine extending through the main body;
    a plurality of propellers, each propeller comprising multiple radially-extending blades that are rotatable about a respective first rotational axis;
    one or more primary motors coupled to the plurality of propellers and configured to rotate the radially-extending blades during a first mode of operation;
    a pair of actuatable hinges, each actuatable hinge moveably connecting at least one of the plurality of propellers to the central spine;
    a plurality of shrouds, each shroud surrounding the blades of at least one of the propellers and being rotatable about a respective second rotational axis; and
    one or more secondary motors coupled to the plurality of shrouds and configured to rotate the shrouds during a second mode of operation,
    wherein each shroud is constructed to rotate independently of the corresponding at least one of the propellers,
    in the first mode of operation, the actuatable hinges orient the first and second rotational axes parallel to vertical, such that rotation of the blades of each propeller by the one or more primary motors generates downward thrust for operation of the vehicle as a flying vehicle, and
    in the second mode of operation, the actuatable hinges orient the first and second rotational axes parallel to horizontal, such that rotation of the shrouds by the one or more secondary motors functions as rotating wheels or treads for operation of the vehicle as a ground vehicle.

2. The vehicle of claim 1, wherein each propeller has a respective primary motor.

3. The vehicle of claim 1, wherein the central spine extends parallel to the horizontal.

4. The vehicle of claim 1, wherein each actuatable hinge is coupled to an opposite end of the central spine.

5. The vehicle of claim 1, wherein each propeller is coupled to an opposite end of one of two respective perpendicular spines that are each respectively coupled to the central spine.

6. The vehicle of claim 1, wherein a number of the propellers is four, a first pair of the propellers is disposed on a first side of the main body and coupled to the main body by one of the pair of actuatable hinges, and a second pair of the propellers is disposed on a second side of the main body opposite the first side and is coupled to the main body by the other of the pair of actuatable hinges.

7. The vehicle of claim 1, wherein the central spine is an elongate cylindrical element.

8. The vehicle of claim 1, wherein the main body comprises a flotation device constructed such that the vehicle floats in water.

9. The vehicle of claim 1, further comprising a control module configured to control the pair of actuatable hinges to transition the vehicle between the first and second modes of operation.

* * * * *